May 17, 1966  W. C. BROWN  3,252,012
CAPACITOR DEVICE FOR ISOSCELES SWEEP GENERATOR
Filed April 1, 1963
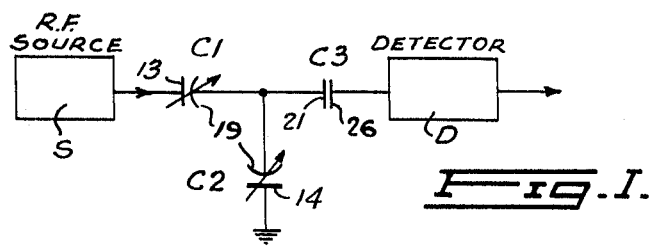
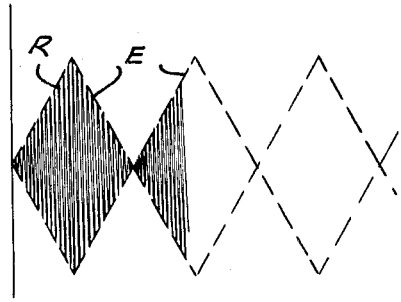
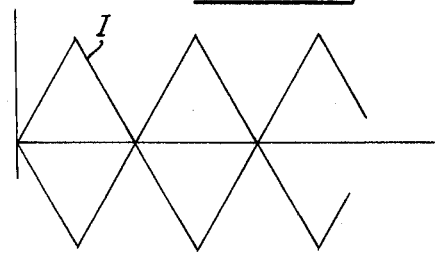
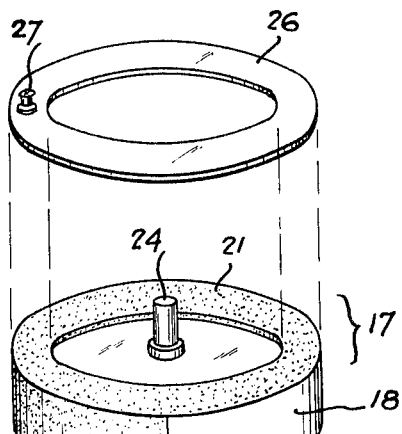
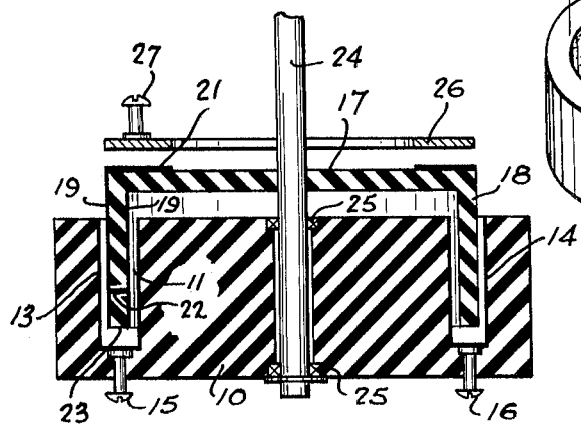
Inventor
William C. Brown
By Stevens, Davis, Miller + Mosher
Attorneys United States Patent Office 3,252,012
Patented May 17, 1966

3,252,012
CAPACITOR DEVICE FOR ISOSCELES SWEEP
GENERATOR
William C. Brown, Ottawa, Ontario, Canada, assignor to National Research Council, Ottawa, Ontario, Canada, a corporation of Canada
Filed Apr. 1, 1963, Ser. No. 269,574
Claims priority, application Canada, Feb. 25, 1963, 869,527
7 Claims. (Cl. 307—108)

This invention relates to a capacitor device for use in an isosceles sweep generator, that is to say a mechanism for generating a wave form in the shape of an isosceles triangle, or, in other words, a wave form consisting of alternate ascending and descending lines of equal and opposite slope. These lines are normally straight lines, but, as indicated below, they may in special circumstances have equal and opposite curvatures. The invention also relates to the isosceles sweep generator itself incorporating such capacitor device.

One use for a sweep of isosceles shape is for controlling the travel of the spot on the display scope of a radar system of a type in which the spot is required to sweep across the scope (say horizontally from left to right) and then, after being moved up or down, to return by being swept back from right to left, instead of flying back instantaneously to the left to commence a second sweep from left to right. This form of scope sweep is useful in the display of echoes received in a radar system in which a narrow radar beam is scanned first in one horizontal plane to form effectively a first wide beam and is then dropped down slightly to scan back again in the opposite direction in another horizontal plane and form effectively a second wide beam. With an isosceles sweep applied to the scope, the spot movement simulates the actual movement of the narrow radar beam.

One object of the present invention is to provide means for generating such an isosceles wave form in which the straight lines of the wave form are accurately linear, and little or no rounding of the wave form takes place where the slope reverses. Since such distortions of the wave shape tend to arise during amplification (which has normally been found necessary with prior devices before the output could be applied to the plates of a display scope), it is a further object of the invention to provide a device which furnishes an output requiring no amplification for this purpose.

Another object is the provision of a capacitor device to form the essential element of a generator for such an isosceles wave form, and indeed a generator capable of generating not only this but related wave forms as required.

In a radar system of the type described above, in which a narrow radar beam is caused to trace out a pair of broad beams, the scanning of the narrow beam may be accomplished by a scanner which forms part of the antenna system and which is continuously rotated to achieve the scanning action. One of the prime uses of the present invention is, as already indicated, to supply a sweep circuit to synchronise a scope spot with such a scanning radar beam. Since the antenna scanner is operated by continuous rotation, it would be convenient to operate the sweep generator similarly, as synchronisation would then be facilitated.

To this end, it is a further object of the present invention to provide a capacitor device for use in an isosceles sweep generator, which is operated by continuous rotation of a shaft. The device can then be coupled to a rotating scanner for positively ensuring synchronisation. Yet a further object is to achieve this result with a capacitor device which is comparatively insensitive to minor mechanical inaccuracies, especially a minor shaft misalignment.

In its broadest aspect the invention consists of a capacitor device comprising
 (a) A fixed member,
 (b) A rotor member,
 (c) Means mounting said rotor member for rotation about an axis relative to said fixed member,
 (d) Surfaces on said fixed member described about said axis and comprising at least two primary electrodes electrically separated from each other and extending arcuately around said fixed member each in a respective one of a plurality of segments disposed around said fixed member,
 (e) A surface on said rotor member described about said axis and comprising a further electrode extending partially around said rotor member in capacitive coupling with each of said primary electrodes sequentially on rotation of said rotor member,
 (f) An electrode surface on said rotor member electrically common with said further electrode,
 (g) And a fixed electrode capacitively coupled to said electrode surface.

Preferably, at least one of said electrode surface and said fixed electrode is annular and is described about the axis of rotation to render said last-mentioned capacitive coupling independent of the rotational position of said rotor member.

In the preferred form of the invention constructed to satisfy all the objects set out above, there are two of said primary electrodes extending around the fixed member in respective diametrically opposed arcs each subtending an angle of substantially 180° at the axis, and the further electrode on the rotor member extends in an arc around such member which subtends an angle of substantially 180° at the axis.

Further advantages are obtained if the fixed and rotor member electrodes are disposed as inwardly and outwardly radially facing surfaces of, respectively, an annular groove described about the axis and formed in either one of said members and an annular skirt portion described about the axis and formed on the other of said members, the skirt portion projecting into the groove.

One form of isosceles sweep generator and capacitor device for use therein, constructed in accordance with the present invention, is illustrated diagrammatically in the accompanying drawings. It is to be understood that this specific description and illustration is provided by way of example only and that the invention is limited solely by the appended claims.

In the drawings:
 FIGURE 1 is a circuit of the isosceles sweep generator;
 FIGURE 2 is a cross-sectional view of the capacitor device employed in the circuit of FIGURE 1;
 FIGURE 3 is an exploded view of the capacitor device of FIGURE 2;
 FIGURE 4 is a first diagram of a generated wave form; and
 FIGURE 5 is a diagram of a further wave form.

FIGURE 1 shows a radio frequency source S of a conventional nature generating a sine wave of say 100 kilocycles per second. The output from source S is shown fed to a network of three capacitors C1, C2 and C3, capacitors C1 and C2 being connected in series between source S and ground, and each being variable in a mutually related manner which is described below. Capacitors C1 and C3 are series connected between the source S and a conventional detector D. The output of detector D is the desired wave form which is fed to whatever instrument requires the isosceles sweep, for example, a radar scope.

Capacitors C1, C2 and C3 are formed as a single capacitor device in the manner shown in FIGURES 2 and 3.

This device comprises an insulating base or fixed member 10 having an annular groove 11 formed in it. Both the side and bottom surfaces of the groove 11 are plated with a suitable conducting metal such as copper, two diametrically opposite, radially extending gaps 12 (FIGURE 3) being provided in this plating. The plated surfaces thus form two electrically separate, primary electrodes 13 and 14. The plating in the bottom of the groove 11, which is similarly divided by the gaps 12, covers over the heads of terminals 15 and 16, while being in electrical contact therewith, so that these constitute output terminals for the electrodes 13 and 14 respectively.

The capacitor device of FIGURES 2 and 3 includes a rotor member 17 formed with an annular skirt portion 18 adapted to extend into the groove 11 in the manner shown in FIGURE 2 while remaining spaced therefrom a sufficient distance to remain out of direct electrical contact therewith. Circumferentially, half of the skirt portion of the rotor 17 is plated on both its inside and outside cylindrical surfaces 19 to form a further electrode, and the entire circumference of an axially facing surface of the rotor 17 is plated to form an electrode surface which is electrically common with electrode 19 by virtue of the plated surfaces extending into each other. Plated surfaces 19 are joined together by a conducting link 22 extending through the skirt portion 18, since the end face 23 of the skirt portion 18 is uncoated.

The rotor 17 is mounted on a shaft 24 supported in bearings 25 in the body 10 so that the groove 11 and skirt portion 18 are coaxial.

There is also provided a metal annular strip 26 arranged to lie immediately above the strip 21 in axial juxtaposition therewith so as to be capacitively coupled thereto. The disc 26 is fixed in relation to the body 10 by a casing (not shown) and has an output terminal 27.

The numerals applied to the various structural parts of the capacitor device of FIGURES 2 and 3 have also been applied to the diagrammatic circuit representation of FIGURE 1. It will be seen that the strips 21 and 26 cooperate to form the capacitor C3 and this is of fixed capacitance. The semi-cylindrical plated surfaces 19 form the common plates of both capacitors C1 and C2, while the other plates of these respective capacitors are formed by electrodes 13 and 14.

The apparatus is operated by rotating the shaft 24 (conveniently in synchronism with a scanner forming part of the antenna of a radar system) so that the rotor 17 rotates to bring its surfaces 19 initially wholly in capacitive coupling with electrode 13 to give capacitor C1 maximum capacitance and capacitor C2 zero capacitance; then to be partly associated with electrode 13 and partly with electrode 14; then to be wholly associated with electrode 14, to reverse the former capacitance values; and so on. In this way, capacitor C1 varies linearly between maximum and zero capacitance, while capacitor C2 does the same in opposite phase. The sum of the two capacitances is constant.

The circuit effect of this related variation of the two capacitances C1 and C2 is shown in FIGURE 4 which illustrates a radio frequency signal R emitted by source S modulated to the shape of an envelope E. After passing through the detector D, this signal appears as the isosceles sweep I shown in FIGURE 5.

Because the capacitance of each of capacitances C1 and C2 falls fully to zero during each cycle, there is substantially no rounding off of the wave form at its foot. There is 100% modulation of the radio frequency signal, and no amplifier is required in the system. No rubbing contacts are employed. Minor mechanical inaccuracies in the centering of the rotor 17 in the body 10 can be tolerated, because both the radially inwardly and the radially outwardly facing surfaces of the skirt portion 18 are plated. If one surface moves slightly towards one face of the groove 11, the opposite surface will move correspondingly further away from the opposite face of the groove to compensate for the effect, and maintain a substantially uniform overall capacitance. The end surface 23 is not plated so that minor errors of axial alignment will not affect the capacitance values.

It will be apparent that modifications to the structure illustrated can be made. If preferred, the groove may be formed on the rotor member and the skirt portion formed on the fixed member. Howeevr, to avoid rubbing contacts, the rotor member will always be positioned between the two fixed members, and the partially plated surface (the further electrode) will always be formed on the rotor member whether such rotor member has the skirt portion or the groove. Similarly, the split surface (the primary electrodes) will always be formed on the fixed member. The avoidance of rubbing contacts is an important practical advantage of the device.

In the example given, the electrodes 13, 14 and 19 have each been shown as occupying segments extending around the respective members in arcs that each subtend substantially 180° at the axis. If somewhat modified wave shapes are desired, one, or more than one, of these segment lengths may be modified to be less than 180°. The primary electrodes (13 and 14) will be generally radially opposed to each other whether of 180° or not, but not necessarily exactly diametrically opposite each other. An example of such a possibility resides in the addition of a third primary electrode to the fixed member. Each primary electrode could then extended over a 120° arc, when the cooperating electrode on the rotor could also conveniently have an extent of 120°, although this need not necessarily be so. The circuit will be a more complex network than FIGURE 1 having more than one output so that phase-related waves can be generated. The exact form of these wave shapes will depend on the relative angular extents of the various electrodes and the nature of the circuit in which they are connected.

Another alternative is to employ four primary electrodes each 90° in arc and to connect opposite pairs in parallel. This will produce a similar output to that of FIGURE 5 but at double the frequency for a given speed of shaft rotation.

Yet another minor modification can be introduced by some overlapping of the electrode segments. Thus, if the gaps 12 were to extend other than radially across the bottom surface of the groove 11, the rotor electrode would start to be coupled capacitively to one primary electrode before becoming entirely uncoupled from the other primary electrode. Again this will slightly modify the wave shape.

If the widths of the primary electrodes are varied around the device by tapering the plated surfaces, the resulting wave shape will be the same as is shown in FIGURE 5 except that each line will be curved. Each ascending curve will be a mirror image of each descending curve.

As to the coupling between strips 21 and 26, the normal requirement here is uniformity of capacitance value independent of the rotor position, although again, in a special case, the possibility of making use of a varying capacitance obtained from rotation of the rotor is not excluded from the broad concept of the invention.

Even assuming that uniform capacitance is required, it is still not essential that both the strips 21 and 26 be complete annuli. As long as one is complete (strip 26 for example) it can cooperate continuously and uniformly with a non-annular surface, provided of course that the surface which is annular is described about the axis of rotation. However, for convenience and maximum capacitance value, it is preferred to make both strips 21 and 26 annular.

I claim:
1. A capacitor device comprising
   (a) a fixed member,
   (b) a rotor member,
   (c) means mounting said rotor member for rotation about an axis relative to said fixed member,

(d) surfaces on said fixed member described about said axis and comprising at least two primary electrodes electrically separated from each other and extending arcuately around said fixed member each in a respective one of a plurality of diametrically opposed segments disposed around said fixed member and each subtending an angle of substantially 180° at said axis, (e) a surface of said rotor member described about said axis and comprising a further electrode extending partially around said rotor member in capacitive coupling with each of said primary electrodes sequentially on rotation of said rotor member, (f) an electrode surface on said rotor member electrically common with said further electrode, (g) and a fixed electrode capacitively coupled to said electrode surface.

2. A capacitor device according to claim 1, wherein at least one of said electrode surface and said fixed electrode is annular and is described about said axis to render said last-mentioned capacitive coupling independent of the rotational position of said rotor member.

3. A capacitor device according to claim 1, wherein said further electrode extends around the rotor member in an arc subtending an angle of substantially 180° at said axis.

4. A capacitor device according to claim 1, wherein said fixed and rotor member surfaces are disposed as inwardly and outwardly radially facing surfaces on an annular groove described about said axis and formed in one of said members and on an annular skirt portion described about said axis and formed on the other of said members to project into said groove.

5. A capacitor device comprising
  (a) a fixed member,
  (b) a rotor member,
  (c) means mounting said rotor member for rotation about an axis relative to said fixed member,
  (d) one of said members having an annular groove formed therein described about said axis,
  (e) the other of said members having an annular skirt portion described about said axis to project into said groove with radially inwardly and radially outwardly facing surfaces of said skirt portion in spaced radial juxtaposition to corresponding radially outwardly and radially inwardly facing surfaces of said groove,
  (f) those of said surfaces on the fixed member comprising a pair of primary electrodes electrically separated from each other and extending around the fixed member in respective diametrically opposed arcs each subtending an angle of substantially 180° at said axis,
  (g) those of said surfaces on the rotor member comprising a further electrode extending around the rotor member in an arc subtending an angle of substantially 180° at said axis and being in capacitive coupling with said primary electrodes alternately on rotation of said rotor member,
  (h) a first annular electrode strip on said rotor member described about said axis and electrically common with said further electrode,
  (i) and a second fixed annular electrode strip described about said axis and capacitively coupled to said first strip.

6. An isosceles sweep generator comprising
  (a) a high frequency source,
  (b) a capacitor device,
  (c) a detector,
  (d) said capacitor device comprising
    (i) a fixed member,
    (ii) a rotor member,
    (iii) means mounting said rotor member for rotation about an axis relative to said fixed member,
    (iv) one of said members having an annular groove formed therein described about said axis,
    (v) the other of said members having an annular skirt portion described about said axis to project into said groove with radially inwardly and radially outwardly facing surfaces of said skirt portion in spaced radial juxtaposition to corresponding radially outwardly and radially inwardly facing surfaces of said groove,
    (vi) those of said surfaces on the fixed member comprising a pair of primary electrodes electrically separated from each other and extending around the fixed member in respective diametrically opposed arcs each subtending an angle of substantially 180° at said axis,
    (vii) those of said surfaces on the rotor member comprising a further electrode extending around the rotor member in an arc substending an angle of substantially 180° at said axis and being in capacitive coupling with said primary electrodes alternately on rotation of said rotor member,
    (viii) a first annular electrode strip on said rotor member described about said axis and electrically common with said further electrode,
    (ix) and a second fixed annular electrode strip described about said axis and capacitively coupled to said first strip,
  (e) means connecting one of said primary electrodes to the output of said source,
  (f) means connecting the other of said primary electrodes to ground,
  (g) means connecting said second fixed annular strip to said detector,
  (h) and means for rotating said rotor member to vary the capacitance between said one primary electrode and said further electrode between zero and a maximum value, and simultaneously, in opposite sense, to vary the capacitance between said other primary electrode and said further electrode between zero and a maximum value.

7. An isosceles sweep generator comprising
  (a) a single high frequency source,
  (b) a source of reference potential,
  (c) a capacitor network,
  (d) a detector,
  (e) said capacitor network comprising first and second capacitances each variable between zero and maximum capacitance and a third fixed capacitance,
  (f) means connecting said first and second capacitances in series between the output of said high frequency source and said source of reference potential,
  (g) means connecting said first and third capacitances in series between the output of said source and the input of said detector,
  (h) and means for simultaneously varying said first and second capacitance between zero and maximum capacitance in a 180° phase relation to each other.

References Cited by the Examiner

UNITED STATES PATENTS 3,147,374  9/1964  Diamond _____ 317—249 X

MILTON O. HIRSHFIELD, *Primary Examiner.*

J. J. SWARTZ, *Assistant Examiner.*